United States Patent [19]

Berry

[11] Patent Number: 4,695,386

[45] Date of Patent: Sep. 22, 1987

[54] PROCESS FOR THE DECOLORIZATION OF PULP MILL PROCESS STREAMS

[75] Inventor: W. Wes Berry, Lakeland, Fla.

[73] Assignee: Advanced Separation Technologies Incorporated, St. Petersburg, Fla.

[21] Appl. No.: 735,762

[22] Filed: May 20, 1985

[51] Int. Cl.$^4$ .............................................. C02F 9/00
[52] U.S. Cl. .................................. 210/665; 210/676; 210/694; 210/917; 210/928
[58] Field of Search ............... 210/665, 669, 670, 675, 210/676, 694, 267, 284, 908, 917, 928

[56] References Cited

U.S. PATENT DOCUMENTS

| | | | |
|---|---|---|---|
| 2,617,986 | 11/1952 | Miller | 210/267 |
| 3,652,407 | 3/1972 | Paleos | 210/669 |
| 4,000,033 | 12/1976 | Nicolle et al. | 210/917 |
| 4,383,920 | 5/1983 | Muller et al. | 210/284 |
| 4,522,726 | 6/1985 | Berry et al. | 210/267 |

*Primary Examiner*—Ivars Cintins
*Attorney, Agent, or Firm*—Burns, Doane, Swecker & Mathis

[57] ABSTRACT

A process for the decolorization of pulp mill process streams is described. The effluent from the process contains color bodies and organic materials, and is first fed to an acidification reactor where the pH is reduced. This causes a portion of the color bodies to precipitate. A flocculant is added to coagulate the precipitated lignins, and the solution is filtered. The filtrate then passes through a series of chambers where it is contacted with activated carbon in an advanced separation device (ASD). The regeneration of the carbon occurs simultaneously in other chambers of the ASD. The treated filtrate with significantly lower color bodies passes out of the ASD in a substantially continuous stream.

23 Claims, 2 Drawing Figures

PROCESS FOR THE DECOLORIZATION OF PULP MILL PROCESS STREAMS

This invention relates to paper making processes, and more particularly to processes for removing color bodies and organic compounds from various process streams originating in the production of pulp and paper materials.

BACKGROUND OF THE INVENTION

One of the chemical pulping processes that is commonly used for making paper is known as the kraft process, which involves cooking of pulping wood chips in an aqueous solution of sodium hydroxide, sodium carbonate and sodium sulfide. Usually, this process is carried out in a digester at temperatures of about 160° C. to 180° C. Following the cooling stage, the liquor is separated from the pulp and subjected to a recovery treatment to recover the chemical and energy values. In many cases, the pulp is further treated with various chemicals to remove the lignins or color bodies from the pulp. This is referred to as the bleaching step, and is crucial to the production of high quality, low color paper materials.

Further, in the various stages of the papermaking process, i.e., pulping, bleaching, etc., large amounts of water are used. While significant improvements have been made in conserving and reusing water in the paper making process, it is still necessary to discharge a certain amount of waste water from the system.

The effluent from a pulp mill includes the dark colored liquor containing lignin degradation products. Since pulp mill plants produce large quantities of this densely-colored effluent, the discharge of this effluent into adjacent streams and bodies of water can cause an objectionable discoloration of the water.

Various processes have been proposed for decolorization of the effluent. Conventional non-biological effluent treatment processes such as ultra-filtration, reverse osmosis, precipitation with lime or alum, and carbon absorption are effective in removing color from such effluent, but are prohibitively expensive for use in treating the quantities of such effluents generated by commercial-size pulp and paper plants. The cost of large amounts of chemical reagents, high maintenance costs and expensive facilities have rendered these proposed solutions impractical.

One of the constituents of the effluent stream is lignin which, if recovered, can be used as a source of energy for generating heat for use in the pulp process. Although several processes have been proposed for recovering heat from components of the effluent stream, these processes have been expensive, since they typically require large quantities of reagents and a substantial capital investment in the heat recovery systems.

For example, it has been the practice to recover heat from the kraft liquor by using it as a fuel in a heat recovery boiler. This process causes the formation of a pool of molten inorganic salts, which are further treated to regenerate the caustic material used in the pulping process.

OBJECTS AND SUMMARY OF THE INVENTION

In view of the deficiencies of the prior processes for decolorization of pulp mill effluents and processes for recovering energy from such effluents, it is an object of this invention to provide an efficient and practical process for decolorization of effluents, especially those originating in plants employing a bleaching operation, and to provide a source of by-products for combustion.

It is a further object of the invention to provide an efficient process for decolorization of pulp mill effluents in which the discharge stream is of adequate quality to be conducted into natural bodies of water without further treatment.

These objects are accomplished in accordance with a preferred embodiment of the invention by a decolorization process in which the pulp mill effluent is first acidified to a pH of less than 7.0. A pH value of between 2.0 and 4.0 is preferred. A flocculent is added to aid in settling and filtration of any precipitated lignin which results from the acidification step. The acidified liquid is filtered and passed through a bed of activated carbon where organic compounds such as lignins and chlorinated phenols are adsorbed onto the carbon. The treated effluent flows out of the carbon bed in a continuous stream. The effluent can then be either recycled and used in various process wake make-up applications or, after adjusting the pH with lime or other suitable alkaline, may be discharged into natural bodies of water. One portion of the carbon bed is regenerated with a solution of sodium hydroxide while the filtrate stream passes through another portion of the bed. The lignins are desorbed into the caustic solution and the spent regeneration solution can be recycled into the paper mill, incinerated, or treated by known techniques. The precipitated lignin may be added to the spent regeneration solution and used as a fuel.

BRIEF DESCRIPTION OF THE DRAWINGS

This preferred embodiment of the invention is illustrated in the accompanying drawings, in which.

DETAILED DESCRIPTION

In the conventional kraft bleaching process, the effluent from the bleaching process contains a large portion of the color bodies and organic chloride compounds which may be discharged from the plant. Typical bleach effluent may consist of a number of streams, but in general contain a large portion of so-called "C-1" and "E-1" material according to conventional pulp and paper process nomenclature. The pH of the effluent will vary from acidic, i.e., pH of 2 to 4, to basic, i.e., pH of 10 or above. When discharged from the process, the effluent stream typically is at a temperature between 120° F. and 160° F.

Figure 1:
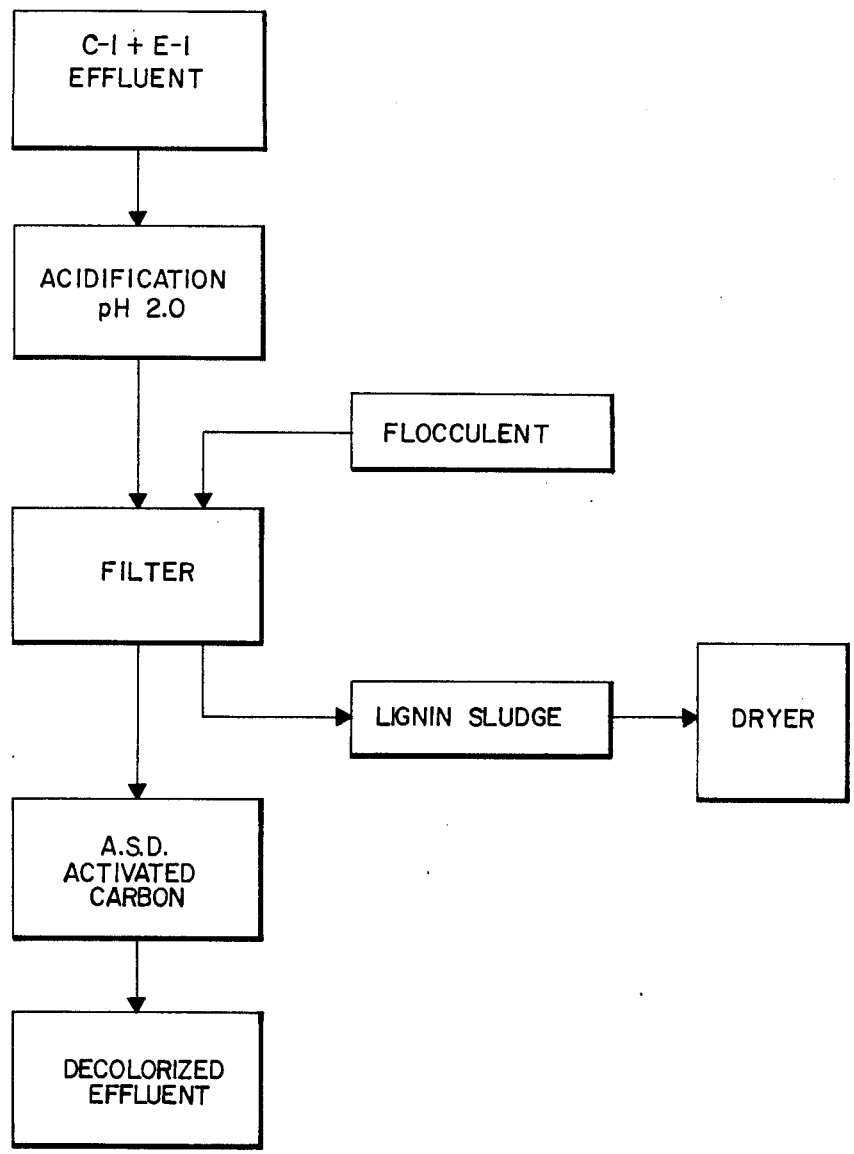
FIG. 1 is a flow diagram showing the stages in the process of this invention.

The preferred embodiment of the process is illustrated in FIG. 1. The effluent is first acidified to reduce the pH to between 2.0 and 4.0. The acidification of the effluent may be effected in a conventional manner by a strong mineral acid, such as nitric, sulfuric or hydrochloric acid, but the use of sulfuric acid is preferred, since in general this is compatible with the existing plant facility.

As a result of the acidification of the effluent, a portion of the lignin compounds may precipitate. The majority of the high molecular weight color bodies and chlorinated organic compounds remain in solution. The acidified liquid is mixed with a flocculent, such as Nalco 7871, to coagulate the precipitated lignins. The solution is then clarified and filtered in a conventional manner, such as by drum or belt filters, or rafted clarifiers. The lignin sludge from the filter can be dried, if desired, and supplied to the recovery boiler or other combustion device to derive heat energy from the lignin.

The filtrate, which is lighter in color than the effluent supplied to the acidification tank, is conducted to an advanced separation device, which is illustrated and described in U.S. patent application Ser. No. 713,492, filed Mar. 19, 1985, the disclosure of which is incorporated herein as if fully set forth. The advanced separation device (ASD) allows the flow of fluid through an adsorption bed of relatively short length in a substantially continuous stream. Regeneration of the bed occurs without interrupting the stream. This is accomplished by providing a plurality of chambers on a rotating carrousel. The adsorption material, activated carbon, is contained in the chambers and a valve arrangement conducts the filtrate stream to each of the chambers in sequence. During the periods when the filtrate is not passing through the adsorption medium in the chamber, wash solutions and regeneration solutions are being fed to the chambers to prepare them for the next adsorption cycle.

Figure 2:
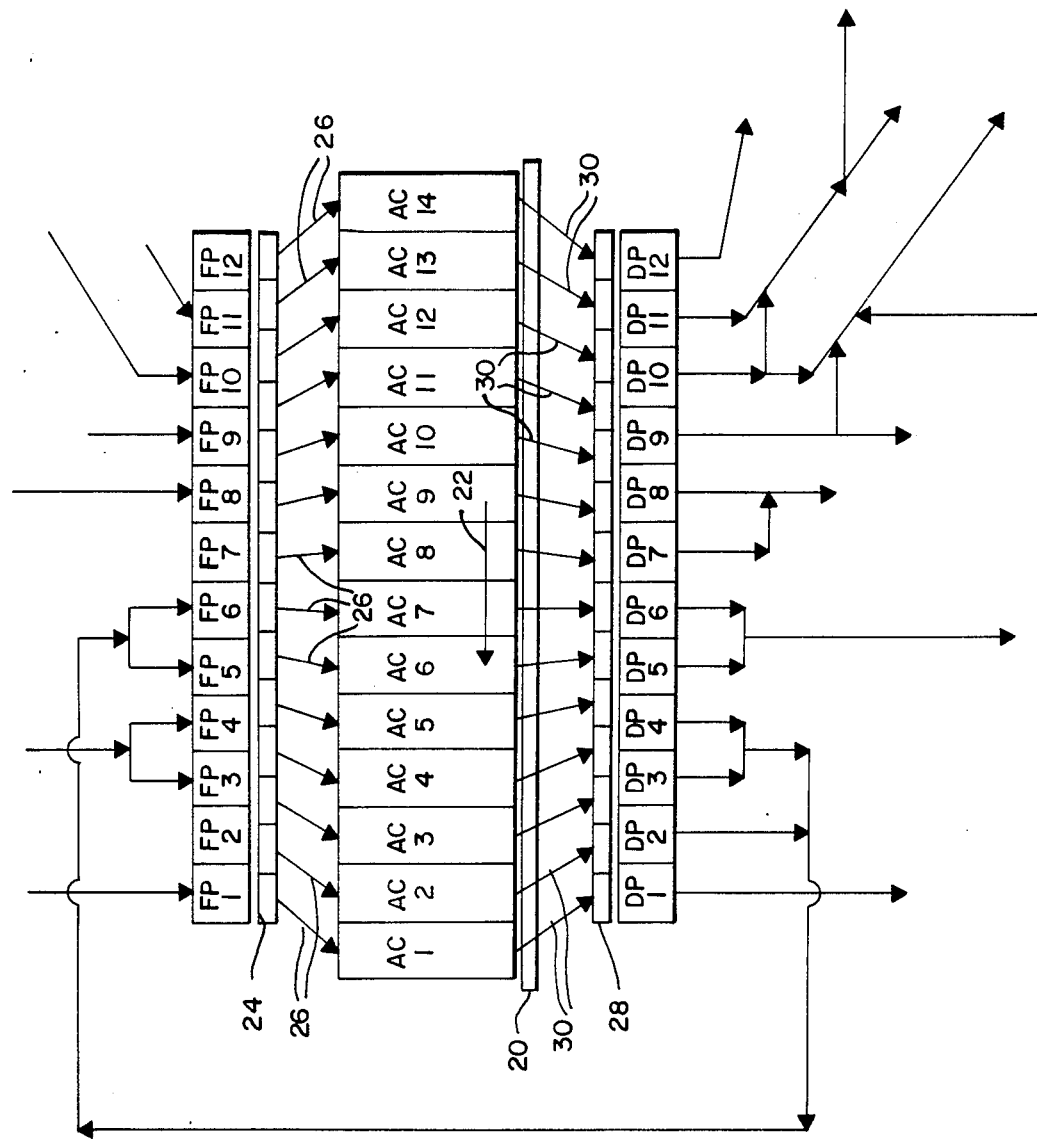
FIG. 2 is a schematic representation of the advanced separation device as used in the process of this invention.

The ASD is shown schematically in FIG. 2 with a series of adsorption chambers designated AC1 to AC14 which are arranged on a carrousel 20 to rotate in the direction of the arrow 22. Fixed feed ports designated FP1 to FP12 are positioned above the adsorption chambers, and a valve plate 24, which rotates with the carrousel 20, controls the flow of fluid from the respective feed ports through individual conduits 26 to the adsorption chambers, as is described more fully in the above-mentioned patent application. Similarly, fixed discharge ports designated DP1 to DP12 are positioned below the adsorption chambers. A valve plate 28, which rotates with the carrousel 20, controls the flow of fluid from the adsorption chambers through individual conduits 30 to the respective fixed discharge ports. Although the chambers are shown in FIG. 2 as arranged in a row, the chambers are actually arranged in a circle so that as the chambers rotate about the central axis of the carrousel 20 at a uniform rate, they receive the various streams in the sequence shown in FIG. 2. The feed and discharge conduits to the ASD remain stationary.

Each of the chambers AC1-AC14 contains activated carbon, which is effective to adsorb organic compounds such as lignins and chlorinated phenols onto the carbon. A range of carbons can be used, but conventional decolorizing material, such as Imperial Chemical Industries DARCO 8×20 is quite effective. Preferably, the height of the carbon bed in each chamber is between two feet and five feet. The filtrate is conducted first to the feed ports FP3 and FP4, as shown schematically in FIG. 2. In the illustrated embodiment, the flow configuration includes twelve (12) feed ports, twelve (12) discharge ports and fourteen (14) adsorption chambers. As explained in the above-mentioned patent application, the number of feed and discharge ports and adsorption chambers can be greater or less than the number shown in FIG. 2 to accomodate parallel or series flow, or combinations thereof. Thus, it is possible to employ a small number of fixed ports and twenty (20) or thirty (30) or more adsorption chambers. In addition, the valve interfaces can be fashioned so that, for example, two or more feed or discharge ports could be combined. The liquid discharged from the discharge ports DP3 and DP4 is conducted in counter-current flow from those ports to the inlet of the feed ports FP5 and FP6 from which it flows in parallel fashion into the chambers AC6 and AC7, as illustrated in FIG. 2. It should be noted that the liquid flows in parallel through the feed ports FP3 and FP4, which means that the flow into each adsorption chamber lasts twice as long as it would if there were only a single feed port supplying the liquid. In addition, series flow occurs between the discharge ports DP3 and DP4, and the feed ports FP5 and FP6. In this process, the number of passes through successive chambers of the effluent should be between 3 and 6, depending on the height of carbon in each bed, so that the total height is between 12 and 16 feet. It has been found that this process can be run successfully at a flow rate of between 8 and 20 gallons per minute per square feet of surface. The liquid discharged from ports DP5 and DP6 contains significantly lower color values than the filtrate that is supplied to the feed ports FP3 and FP4. The effluent from the ports DP5 and DP6 has a pH of between 2 and 4, and before discharging the effluent to a natural stream or body of water, it would be necessary to raise the pH. The effluent from the ports DP5 and DP6 could also be used in other process steps throughout the pulp mill where low pH water would be acceptable. For example, there are various filtration washes where this low pH water could be used.

After the carbon in chamber AC3 has been loaded with organic material, it progresses to the position designated AC2 in FIG. 2, where it is allowed to drain, and then to the position AC1, where it is water-washed by liquid from the port FP1 to remove residual filtrate. Similarly, the adsorption chambers receive liquid from the feed ports in succession, e.g., FP6 and then FP5. Thus, all chambers move continuously at a uniform rate in such a manner that optimum use is made of the adsorbents, reagents, etc. As shown in FIG. 2, wash water is supplied through port FP1 and the discharge from port DP1 is received in a tank for further use, as desired. The chamber is next allowed to drain at the position that communicates with FP12. At the next position, in communication with FP11, and eluant comprising partially spent sodium hydroxide solution is contacted with the carbon in a continuous counter-current fashion as previously described with respect to the flow of the filtrate through the chambers at FP3 and FP4 and FP5 and FP6. Although only two positions, i.e., FP10 and FP11, are shown, additional chambers can also be used for this step of the process.

The regeneration solution is preferably an aqueous sodium hydroxide solution at a concentration from about 2% to about 20% by weight, with a preferred range of 4% to 8% by weight. The temperature of the regeneration solution is preferably between 120° and 160° F. The adsorbed organic compounds are removed from the carbon and dissolved into the regeneration eluant. It should also be noted that since a small amount of regeneration fluid is required per 1,000 gallons of solution treated, the solution is preferably recirculated through each position, DP10 and DP11, and a small amount of concentrated (30-50% NaOH) solution is added as necessary to maintain the proper alkalinity, as shown in FIG. 2.

In order to neutralize any remaining NaOH on the carbon, an acid wash solution is supplied to the chambers through feed ports FP8 and FP9 in series. The acid wash can be any suitable acid that is capable of lowering the pH to less than 7.0.

Preferably, the spent eluant passes through an evaporator to recover the caustic material, while the remainder of the spent eluant could be sent to recovery boilers so that the organic value could be used to provide heat.

The invention will be further described in connection with the following example, which is set forth for purposes of illustration only.

EXAMPLE

Preliminary test work has been conducted using activated carbon to reduce the lignin and chloro-organic concentration of effluents from the pulp and paper process. The test work involves treatment of a combined C-1 plus E-1 effluent, which originates in the pulp bleaching process. This example is based upon 10,000 gallons of combined C-1 plus E-1 effluent per ton of pulp. The characteristics of a typical C-1 plus E-1 effluent are as follows:

Volume: 10,000 gals/ton pulp
*Color units (Pt./Co.): 3,800–4,000
pH: approx. 2.4
% Cl: 0.13
Temperature: 120°–160° F.
*NCASI The amount of spent regeneration solution will vary from ½% to 2% of the inlet effluent volume, depending on the nature of the feed. A typical value for the volume of the spent regeneration solution in comparison with the volume of the feed effluent would be about 1%.

A material balance based on 1 ton of pulp (10,000 gals. of feed effluent) was prepared from the test data. This example presents the information based on differential, bench-scale tests.

The effluent was treated with a 50% sulfuric acid solution (0.3% by weight) to lower the pH to between 1.5 and 1.8. This acidification step resulted in the precipitation of a portion of the lignin compounds. A flocculent was added to aid in setting and in filtration of the precipitated lignin. The acidified liquid was supplied to a filter chamber and the precipitated lignin was transferred to a dryer. The dried weight of the lignin was 21 pounds. The filtrate from the precipitated lignin step contained 2,415 color units with a pH of 1.61. The filtrate was then supplied to a contacting chamber, which simulates the ASD, and the filtrate was contacted with activated carbon in the chamber. The treated effluent from the differential contact had a color value of 467 units and a pH of less than 2. The carbon, which had been loaded with the organic compounds, was washed with a small amount of water, then treated with a solution of 8% sodium hydroxide. The spent regeneration solution had a color value of in excess of 60,000 units and a pH of greater than 11.0. The regeneration solution would then be further treated by evaporation, incineration, or other suitable process to recover the chemical and fuel values. From this example, it can be seen that the color units were reduced by over 80% in the effluent from the simulated ASD. Higher reduction rates are achievable, depending on the final effluent requirements.

This process overcomes a number of the limitations of prior processes, and allows for a cost effective method to remove both aesthetically unpleasant and potentially toxic organic materials from pulp mill discharge.

Although activated carbon has been used previously to remove color from pulp mill streams, regeneration of the spent carbon was typically done by removing the carbon from the contacting chamber, then using thermal energy (combination gases) to regenerate the material. This resulted in both attrition and thermal losses. For this reason, the use of carbon has been thought to be inefficient. An important advantage of the process of this invention is that activated carbon can be used in a continuous manner without thermal regeneration, and without any substantial loss of carbon.

While this invention has been illustrated and described in accordance with a preferred embodiment, it is recognized that variations and changes may be made therein, without departing from the invention as set forth in the claims.

What is claimed is:

1. A process for the decolorization of pulp mill effluent streams comprising:
   (a) acidifying the effluent to below pH 4.0, thereby precipitating color bodies from the effluent;
   (b) filtering the effluent;
   (c) conducting the filtrate through a carbon bed to adsorb organic compounds from the effluent onto the carbon; and
   (d) regenerating the carbon by passing a caustic solution through the carbon bed.

2. The process according to claim 1 wherein the caustic solution is an aqueous solution of sodium hydroxide.

3. The process according to claim 1 wherein said acidifying step includes supplying a solution of sulfuric acid to said effluent.

4. The process according to claim 1 wherein said carbon bed is contained in a plurality of chambers, and including conducting the filtrate through said chambers in a predetermined sequence.

5. The process according to claim 4 wherein said regenerating step occurs in a predetermined sequence relative to said filtrate conducting step.

6. The process according to claim 1 including discharging said filtrate from said carbon bed in a substantially continuous stream concurrently with said regenerating step.

7. The process according to claim 1 wherein said carbon bed is contained in a plurality of chambers, and including conducting said filtrate in parallel through a plurality of said chambers, and including discharging said filtrate from said plurality of chambers and into another of said chambers in series with the filtrate discharged from the chambers.

8. The process according to claim 1 including feeding acid wash water to said carbon bed between said regenerating step and said filtrate conducting step.

9. A process for decolorization of pulp mill effluent streams comprising:
   (a) feeding the effluent stream through a first port to a plurality of chambers containing carbon on which color bodies are adsorbed;
   (b) advancing said chambers continuously relative to said first port;
   (c) feeding a regeneration solution through a second port to said chambers, said first and second ports being fixed relative to said chambers and individual ones of said chambers receiving said effluent stream and said regeneration solution periodically at spaced intervals; and
   (d) discharging said effluent stream from said chambers in a substantially continuous stream while said chambers are advancing, whereby the color units in the discharged stream are reduced relative to the stream passing through said first port.

10. The process according to claim 9 wherein said effluent stream discharging step includes discharging said stream from said chambers through a discharge port fixed relative to said chambers.

11. The process according to claim 10 wherein said effluent stream feeding step includes feeding said stream in parallel to a plurality of said chambers and conducting said stream discharged from said chambers in series to other of said chambers while said chambers are advancing.

12. The process according to claim 10 wherein the regeneration solution feeding step includes feeding said solution in series from the discharge port to another port adjacent said second port.

13. The process according to claim 12 including feeding an acid washing solution to said carbon bed between said regenerating solution feeding step and said effluent feeding step.

14. The process according to claim 9 wherein said regeneration solution is an aqueous sodium hydroxide solution having a concentration from about 2% to about 20% by weight.

15. A process for decolorization of pulp mill effluent streams comprising:
(a) acidifying the effluent stream by introducing an acid solution to lower the pH to between 1.5 and 1.8;
(b) filtering the acidified effluent stream to remove precipitated color bodies from the effluent stream and thereby producing a filtered effluent;
(c) arranging a plurality of chambers for movement along a continuous path, said chambers containing carbon particles, and arranging a plurality of fixed feed ports and discharge ports for controlling the flow of fluid into and out of said chambers;
(d) advancing said chambers at a uniform rate along said path relative to said ports;
(e) supplying the filtered effluent and a regeneration solution continuously to separate feed ports; and
(f) continuously collecting effluent having reduced color bodies from a discharge port.

16. The process according to claim 15 wherein said regeneration solution is caustic.

17. The process according to claim 16 wherein said regeneration solution is an aqueous solution of sodium hydroxide.

18. The process according to claim 17 wherein said sodium hydroxide solution has a concentration ranging from about 2 to about 20% by weight.

19. A process for decolorization of pulp with effluent streams comprising:
(a) acidifying the effluent stream by introducing an acid solution to lower the pH to between 1.5 and 1.8;
(b) filtering the acidified effluent stream to remove precipitated color bodies from the effluent stream and thereby producing a filtering effluent;
(c) feeding the filtering effluent substantially continuously from a fixed feed port to a predetermined number of individual chambers containing carbon particles and in a predetermined sequence;
(d) adsorbing color bodies on the carbon particles while the filtered effluent passes through the chambers;
(e) discharging the effluent from the chambers substantially continuously through a fixed discharge port in a predetermined sequence;
(f) feeding a regeneration solution substantially continuously from a fixed feed port to said chambers at a predetermined interval prior to feeding the filtered effluent to the chamber;
(g) withdrawing the regeneration solution substantially continuously through a fixed discharge port in a predetermined sequence; and
(h) continuously collecting effluent having reduced color bodies from said effluent discharge port.

20. The process according to claim 19 including washing the carbon in the chambers during said interval between feeding the regeneration solution and feeding the filtered effluent.

21. The process according to claim 19 wherein said regeneration solution is caustic.

22. The process according to claim 21 wherein said regeneration solution is an aqueous solution of sodium hydroxide.

23. The process according to claim 22 wherein said sodium hydroxide solution has a concentration ranging from about 2 to about 20% by weight.

* * * * *